J. P. CLARKSON.
EXCAVATING MACHINE.
APPLICATION FILED OCT. 30, 1917.
1,267,058.
Patented May 21, 1918.
5 SHEETS—SHEET 2.
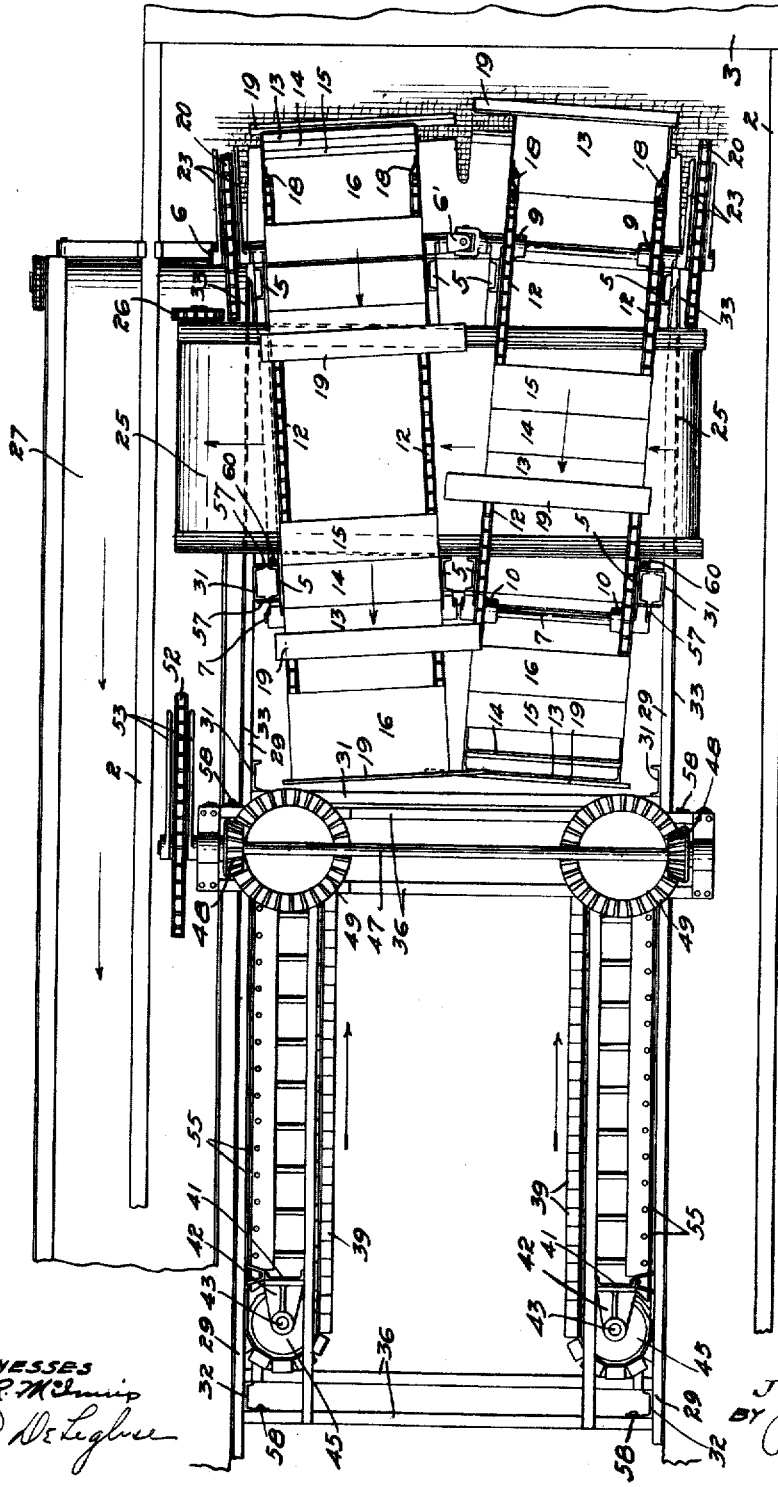

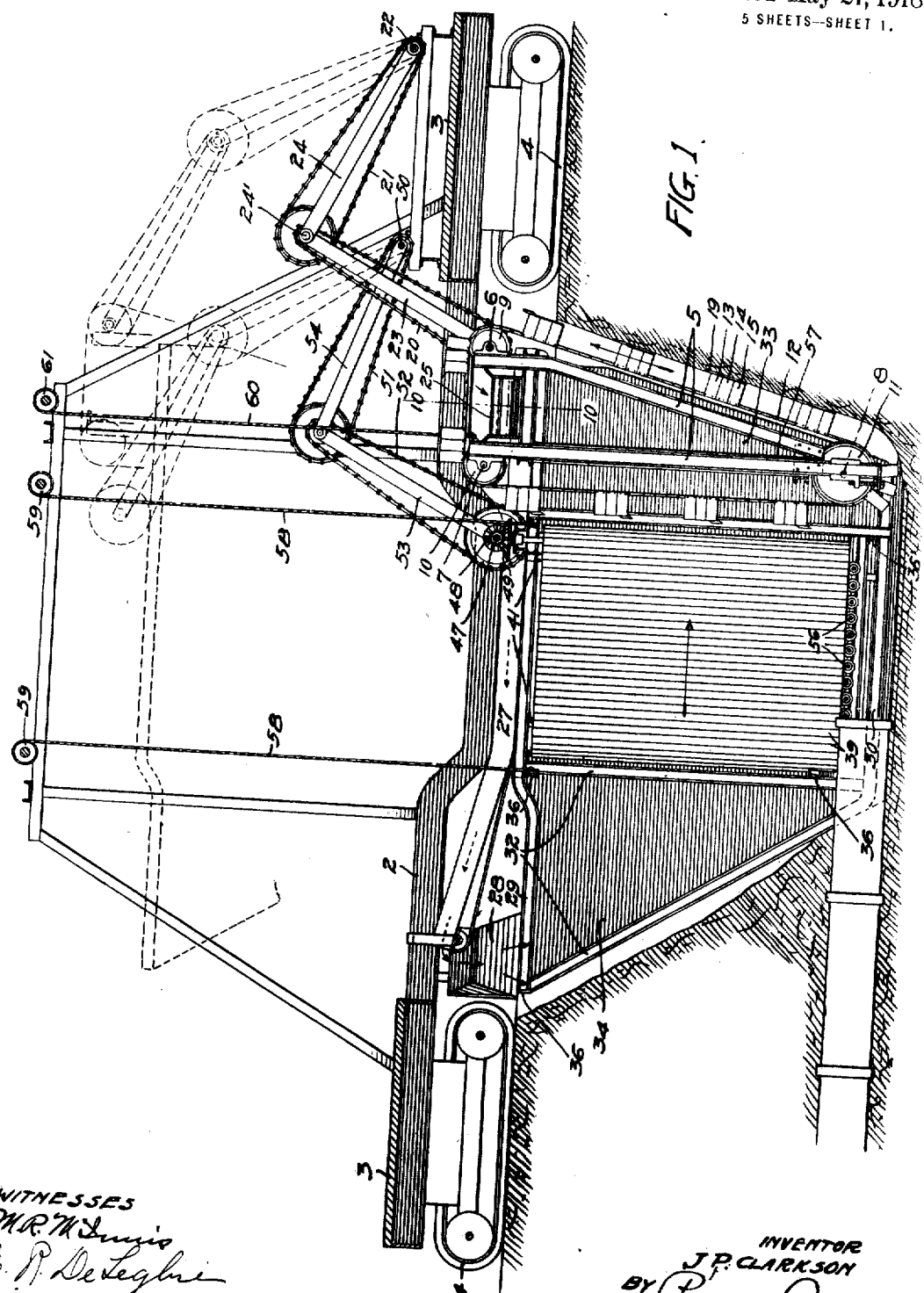

J. P. CLARKSON.
EXCAVATING MACHINE.
APPLICATION FILED OCT. 30, 1917.
1,267,058.
Patented May 21, 1918.
5 SHEETS—SHEET 3.
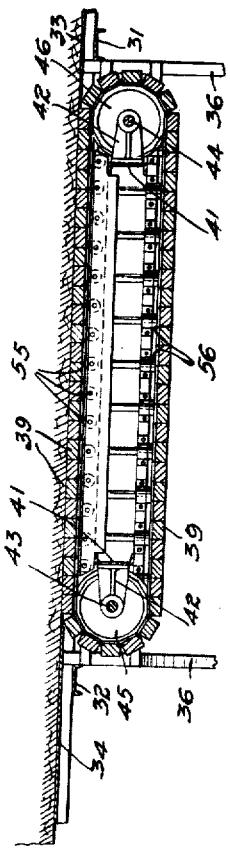
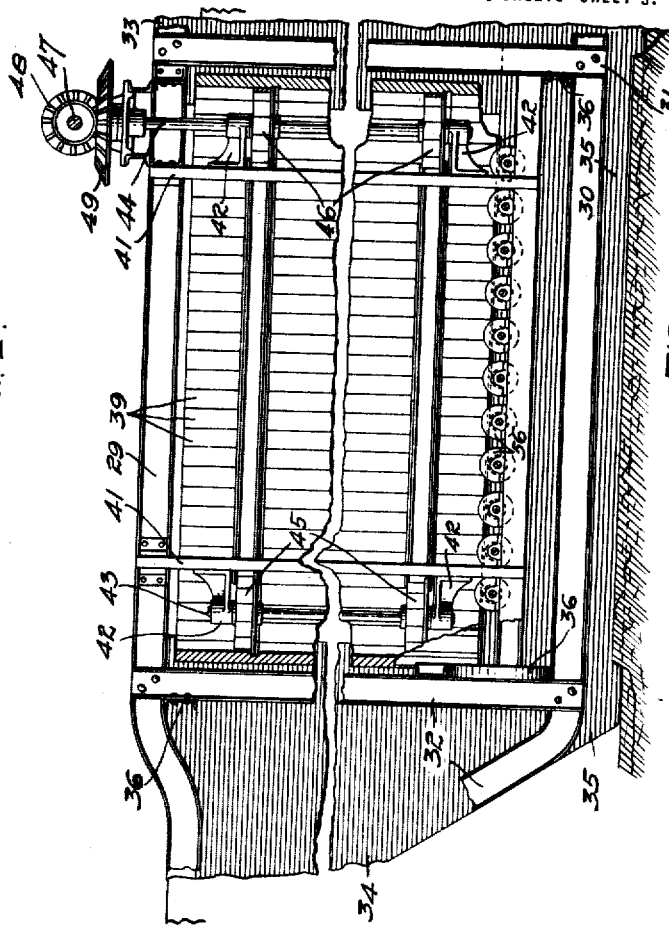
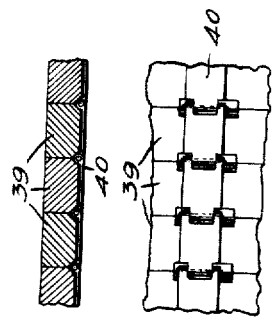
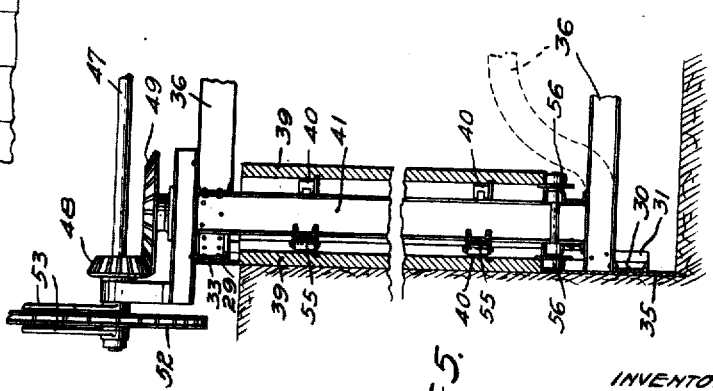
WITNESSES
INVENTOR
J. P. CLARKSON
BY
ATTORNEYS

J. P. CLARKSON.
EXCAVATING MACHINE.
APPLICATION FILED OCT. 30, 1917.

1,267,058.

Patented May 21, 1918.
5 SHEETS—SHEET 5.

WITNESSES
M. P. McInerny
M. R. Deleghn

INVENTOR
J. P. CLARKSON
BY Paul & Paul
ATTORNEYS

UNITED STATES PATENT OFFICE.

J. PAUL CLARKSON, OF ST. PAUL, MINNESOTA.

EXCAVATING-MACHINE.

1,267,058.   Specification of Letters Patent.   Patented May 21, 1918.

Application filed October 30, 1917. Serial No. 199,236.

*To all whom it may concern:*

Be it known that I, J. PAUL CLARKSON, a citizen of the United States, resident of St. Paul, county of Ramsey, State of Minnesota, have invented certain new and useful Improvements in Excavating-Machines, of which the following is a specification.

The object of my invention is to provide an excavating machine by means of which a ditch may be dug to any suitable depth and the tile being laid, the material excavated may be returned to fill the ditch in the rear of the excavating belt.

A further object is to provide a machine having means to prevent the walls of the ditch from caving in on either side of the excavating belt.

A further object is to provide means in the rear of the excavating belt and on each side of the ditch for supporting the walls thereof and protecting the workmen in laying the tile.

A further object is to provide a machine in which provision is made for conveniently raising the excavating belt and the wall guards out of the ditch.

Other objects of the invention will appear from the following detailed description.

The invention consists generally in various constructions and combinations, all as hereinafter described and particularly pointed out in the claims.

In the accompanying drawings forming part of this specification,

Figure 1 is a longitudinal sectional view of the ditching machine,

Fig. 2 is a plan view of a portion of the machine,

Fig. 3 is a sectional view of one of the shields or walls,

Fig. 4 is a plan sectional view of the same,

Fig. 5 is a cross sectional view of the same,

Figs. 6 and 7 are detail views of the endless belt,

Figure 12:
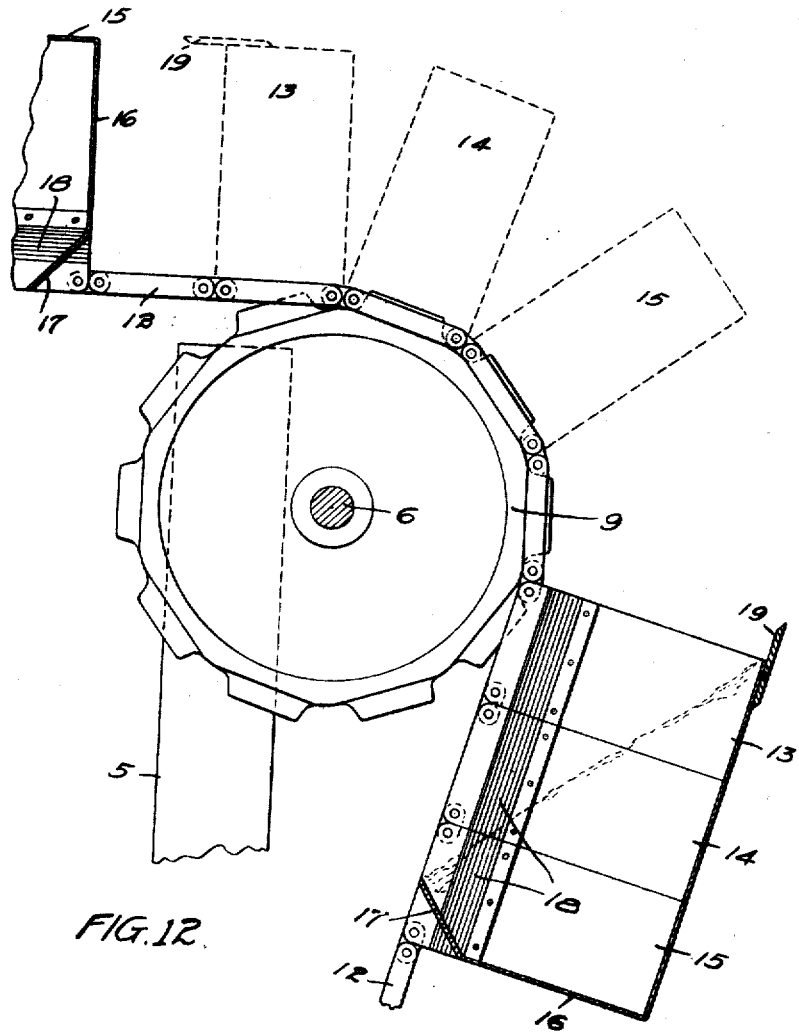
Figs. 12 and 13 are detail views of the bucket construction.

In the drawing, 2 represents a frame provided with front and rear platforms 3 and traction belts 4. These belts are of any preferred caterpillar type and are suitably mounted beneath the platforms 3 in the front and rear of the machine and support the intermediate excavating apparatus. Suitable power, such as a gas engine (not shown) is mounted upon the platform 3 and the belts 4 are operated therefrom. A frame 5 is provided, having short shafts 6, 7, and 8 for sprockets 9, 10 and 11. A chain belt 12 is driven through the sprockets 9 and is provided with suitable buckets composed of sections 13, 14 and 15. A suitable bottom 16 having an upturned extension 17 is provided on the section 15. Each of the sections has a plate 18 secured thereon to form a link or a continuation of the chain 12 (see Fig. 12). The section 13 is provided with a cutting blade 19, whose inner end projects a considerable distance beyond the sides of the buckets.

As shown in Fig. 2, I provide an excavating belt and the buckets therefor on each side of the machine and the driving shafts 6 for these belts have preferably a swivel connection 6' between them, so that they may be driven simultaneously from one side of the machine, though I prefer to provide independent driving means upon opposite sides, as indicated in Fig. 2, such driving means consisting preferably of the sprocket chains 20 and 21 connecting the shafts 6 with a driving shaft 22 on the platform 3. These excavating belts operate in substantially the same manner and a detailed description of one will be sufficient for both of them, corresponding parts being indicated by the same reference numerals.

As shown in Fig. 2, these belts are mounted to operate in intersecting planes, the belts diverging from the rear to the front thereof. The effect of this arrangement is to provide a space increasing gradually in width from the front to the rear between the walls of the ditch and the belts, the forward portions of the belts operating the full width of the cut while the rear portions thereof are drawn together, the object being to provide sufficient space on each side of the belts for walls, guards or shields which prevent the material from caving in and clogging the belts during the excavating operation.

I prefer also to arrange the buckets so that those of one belt will alternate with those of the other belt, a narrow space being provided between the opposite cutting blades, leaving a thin web of soil between them which will break away by its own weight and fall into the buckets.

Links 23 and 24 are pivoted respectively on the shafts 6 and 22 and have their adjacent ends pivoted on a shaft 24' which supports the sprocket wheels of the belts 20 and 21. These links mounted upon each side of the machine allow the frame supporting the excavating belts to be raised or lowered and the belts driven from the shaft 22 in any of their adjusted positions. The elevated position of the links and belts 21 when the excavating belts are raised is indicated by dotted lines in Fig. 1.

The upper portion of the frame is provided with a transverse conveyer 25 arranged between the forward and rear stretches of the excavating belts and extending from side to side of the machine, as indicated in full lines in Fig. 2. This apron or conveyer is driven through the sprocket chain 26 from some moving part of the machine. The material excavated by the buckets will be dumped on this apron when the buckets are inverted in traveling over it and the movement of the apron will carry the material to one side of the machine and deposit it upon the ground or, if preferred, a conveyer 27 may be provided supported on the frame of the machine at one side thereof and parallel therewith and extending backwardly a suitable distance to deliver the excavated material through a spout 28 into the ditch in the rear of the machine and upon the tile as it is laid therein.

The arrangement of the elevating belts in intersecting planes provides a space between them and the side walls of the ditch and to prevent such side walls from caving in, as they would in some kinds of soil in which the machine may be working, I provide shields or guards composed of channel bars 29 and 30 suitably braced by similar bars 31 and 32. Plates of sheet iron or other suitable material 33, 34 and 35 are secured to the channel bars and the shields are braced and rigidly held at the top and bottom by channel bars 36. The forward portions of these shields extend to a point nearly opposite the excavating position of the buckets, as shown in Fig. 2, and serve to support the side walls of the ditch and prevent the material from caving in and interfering with the free action of the excavating belts.

Figure 10:
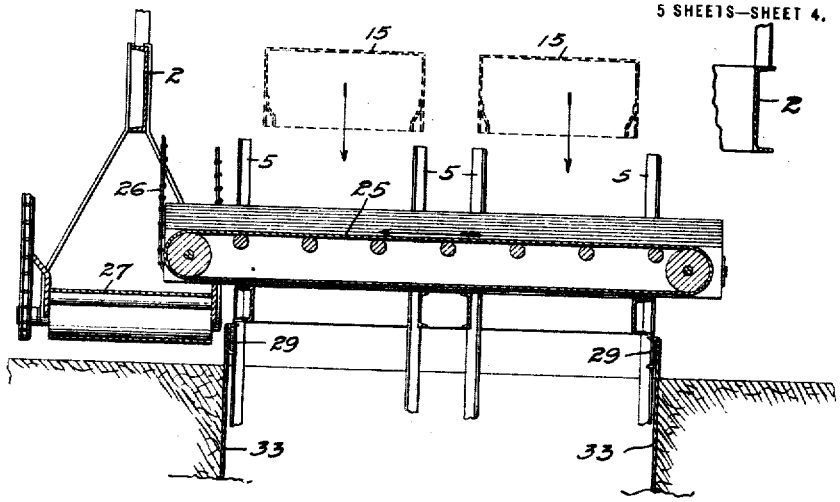
Fig. 10 is a view taken on the line 10—10 of Fig. 1.
Figure 9:
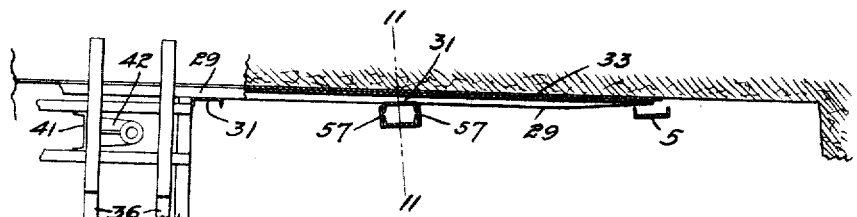
Fig. 9 is a plan view of same, partially in section.
Figure 8:
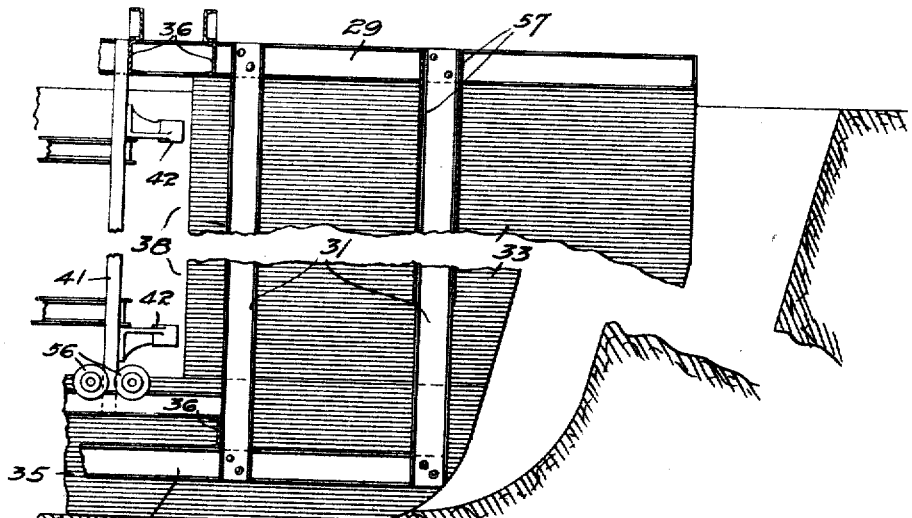
Fig. 8 is a view of one of the shields.

Intermediate to the forward and rear portions of these shields I prefer to provide upright endless belts operating against the side walls of the ditch with sufficient traction to aid in moving the machine and also having the function of supporting such side walls against caving. I prefer to provide openings 38 in the shields opposite which these belt-guards are arranged (see Fig. 8). The belts are preferably composed of slats 39 arranged to bear against the walls of the ditch and of any suitable material. I have shown them made of wood, but do not confine myself to this construction, as where the soil is wet some material not affected by the moisture would be preferable and these slats must be so constructed that the sand and moisture will not work in between them during the operation of the machine. This, however, I regard as a detail of construction which can be worked out as conditions may require.

Figure 11:
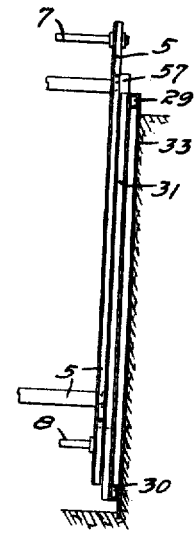
Fig. 11 is a sectional view taken on the line 11—11 of Fig. 9.
Figure 13:
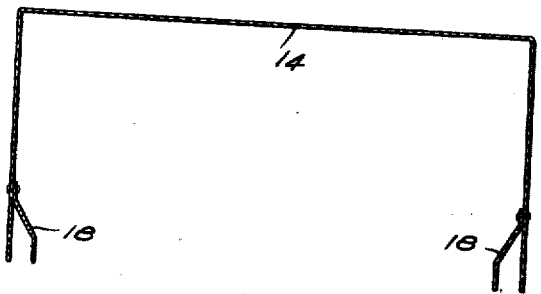

Chains 40 are provided to which the upper and lower ends of the slats are connected. I also provide channels 41 having bearings 42 for shafts 43 and 44, the former having idle sprockets 45 and the latter drive sprockets 46 for the chains 40. A shaft 47 mounted in suitable bearings at the top of each shield is provided with pinions 48 meshing with gears 49 on the shafts 44. The shaft 47 extends transversely of the machine from side to side thereof and is driven from a shaft 50 on the platform 3 through sprocket chains 51 and 52 supported by links 53 and 54 which have the same function as the links 23 and 24 and are capable of folding and unfolding on their pivots to allow vertical adjustment of the shield and the belts. Anti-friction rollers are preferably provided to bear on the chains 40 and similar rollers 56 are provided at the bottom of the shield frame to support the weight of the guard belts (see Fig. 5). The outside vertical channels of the frame 5 are provided with plates 57 (see Fig. 11) which bear on the channels 31 and form guides for the frame 5. Cables 58 are attached to the shields. Suitable drums 59 are provided on which the cables are wound to raise the shields. The frame 5 is raised by means of cables 60 and drums 61. These drums may be operated simultaneously for raising and lowering the excavating belts and shields, or they may be operated independently. The belts operating against the side walls of the ditch between the forward and rear portions of the shields have the further function of protecting the workmen engaged in laying the tile in the bottom of the ditch in the rear of the excavating belts and in wet soil these belts will be equipped or so constructed that the workmen between them will be protected.

In the operation of the machine, the excavating belts will cut and gather up the material and deposit it upon the transverse apron for delivery at the side of the machine or to the conveyer for returning such material to the ditch in the rear of the machine. The shields extending forward on each side of the excavating belts will support the walls of the ditch against a cave-in where the condition of the soil would render such an accident possible or probable, and the endless belts operating in vertical planes intermediate to the forward and rear portions of the shields not only reduce the friction of the shields on the walls of the ditch, but aid in advancing the machine and have also the function of protecting or shielding the workmen in the ditch. The overhead frame and its cable connections with the ditcher frame and shields permit convenient vertical adjustment of the excavating belts and shields so that the ditch depth may be varied, as desired.

In various ways the details of construction herein shown and described may be modified and still be within the scope of my invention.

I claim as my invention:

1. An excavating machine comprising a frame, excavators operating in intersecting planes to form gaps between said excavators and the walls of the ditch, and shields interposed between said walls and said excavators, for the purpose specified.

2. An excavating machine comprising a frame, excavating belts having knives and buckets thereon and operating in intersecting planes and diverging from the rear to the front to provide gaps between them and the side walls of the ditch, and shields interposed in said gaps for supporting said walls.

3. An excavating machine comprising a frame, excavating belts operating in intersecting planes therein and diverging from the rear to the front, shafts for said belts provided at the forward portion thereof, the abutting ends of said shafts having a swivel connection between them and shields interposed in the gaps between said belts and the side walls of the ditch.

4. An excavating machine comprising a frame, excavators mounted to operate in intersecting planes therein and endless belts operating in vertical planes in the rear of said excavators and on opposite sides of the ditch.

5. An excavating machine comprising a frame, excavators mounted to operate in intersecting planes therein, shields provided upon each side of said excavators and in contact with the ditch walls and extending from a point near the forward end of said excavators to a point in the rear thereof, said shields having openings in their side walls in the rear of said excavators and guard belts operating in vertical planes in said openings.

6. An excavating machine comprising a frame, excavators mounted to operate therein in vertical intersecting planes, shields provided upon opposite sides of said excavators, endless belts operating in said shields in contact with the side walls of the ditch and in the rear of said excavators, and means for raising and lowering said excavators and said shields and belts.

7. An excavating machine comprising a frame, excavators mounted therein and endless belts operating in the rear of said excavators and in contact with the side walls of the ditch and having a standing-room space provided between them.

8. An excavating machine comprising a frame, excavators mounted to operate in intersecting planes therein, and means in the rear of said excavators for supporting the walls of the ditch.

9. An excavating machine comprising a frame, excavators mounted therein, and endless belts operating in substantially vertical planes in the rear of said excavators and on opposite sides of the ditch.

10. An excavating machine comprising a frame, excavators mounted to operate in intersecting planes therein to form gaps between them and the walls of the ditch, said gaps increasing in width from the front to the rear of said excavators.

11. An excavating machine comprising a frame, excavators mounted to operate in intersecting planes therein to form gaps between them and the walls of the ditch, said gaps increasing in width from the front to the rear of said excavators, and wall-supporting means projecting into said gaps.

In witness whereof, I have hereunto set my hand this 22 day of Oct., 1917.

J. PAUL CLARKSON.

Witnesses:
WALTER MAUTHE,
REECE STUART.

Copies of this patent may be obtained for five cents each, by addressing the "Commissioner of Patents, Washington, D. C."